US011808215B2

(12) United States Patent
Machado et al.

(10) Patent No.: US 11,808,215 B2
(45) Date of Patent: Nov. 7, 2023

(54) SYSTEM AND METHOD FOR RECONFIGURING A BLEED SYSTEM

(71) Applicant: General Electric Company, Schenectady, NY (US)

(72) Inventors: Jorge Mario Rochin Machado, Queretaro (MX); Michael Anthony Acosta, Mont Belvieu, TX (US); Jordan Scott Warton, Pasadena, TX (US); Richard Michael Watkins, Spring, TX (US); David Garza-Maldonado, Queretaro (MX)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/532,994

(22) Filed: Nov. 22, 2021

(65) Prior Publication Data

US 2023/0160348 A1     May 25, 2023

(51) Int. Cl.
    *F02C 9/18*    (2006.01)
    *F16L 23/04*    (2006.01)
    *F02C 3/13*    (2006.01)

(52) U.S. Cl.
    CPC .................. *F02C 9/18* (2013.01); *F02C 3/13* (2013.01); *F16L 23/04* (2013.01); *F05D 2220/32* (2013.01); *F05D 2250/411* (2013.01); *F05D 2260/606* (2013.01)

(58) Field of Classification Search
CPC ... F16L 27/08; F16L 27/0812; F16L 27/0816; F16L 27/0804; F16L 23/04; F04D 27/00; F05D 2220/32; F05D 2250/411; F05D 2260/606; F02C 9/18; F02C 3/13
See application file for complete search history.

(56) References Cited

U.S. PATENT DOCUMENTS

| 10,641,171 B2 | 5/2020 | Drezek et al. |
| 2018/0209570 A1* | 7/2018 | Tajiri ........................ F02C 7/00 |
| 2018/0291806 A1* | 10/2018 | Drezek ..................... F02C 6/08 |

* cited by examiner

*Primary Examiner* — Todd E Manahan
*Assistant Examiner* — Rodolphe Andre Chabreyrie
(74) *Attorney, Agent, or Firm* — Fletcher Yoder, P.C.

(57) ABSTRACT

A system includes a bleed system configured to direct a bleed flow from a compressor section to an exhaust section of a gas turbine engine. The bleed system includes a first bleed conduit section configured to couple to the compressor section, a second bleed conduit section configured to couple to the exhaust section, and a first rotatable joint coupling together adjacent conduits of the first and second bleed conduit sections. The second bleed conduit section has components configured to rotate between a plurality of configurations relative to the first bleed conduit section and the compressor section via the first rotatable joint. The plurality of orientations corresponds to a plurality of exhaust outlet orientations of the exhaust section, and the components of the second bleed conduit section are the same in each orientation.

20 Claims, 6 Drawing Sheets

SYSTEM AND METHOD FOR RECONFIGURING A BLEED SYSTEM

BACKGROUND

The subject matter disclosed herein relates to a gas turbine system and, more particularly, a bleed system for a compressor of the gas turbine system.

A gas turbine system includes a compressor, a combustor, and a turbine. The compressor compresses an intake air in one or more stages to produce a compressed air. The combustor mixes the compressed air with fuel and combusts the fuel with the compressed air to generate hot combustion gases. The turbine directs the hot combustion gases through one or more turbine stages to drive rotation of a shaft, which may be coupled to the compressor and a load. Additionally, the gas turbine system may bleed a portion of the compressed air through a conduit of a bleed system to a target location different from the combustor. Unfortunately, the target location may be different in various configurations of the gas turbine system, which may result in the need for different conduit designs to accommodate each of the various configurations of the gas turbine system. Accordingly, a need exists for a bleed system configured to move between different configurations and associated target locations in the gas turbine system, thereby reducing part count inventory.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In certain embodiments, a system includes a bleed system configured to direct a bleed flow from a compressor section to an exhaust section of a gas turbine engine. The bleed system includes a first bleed conduit section configured to couple to the compressor section, a second bleed conduit section configured to couple to the exhaust section, and a first rotatable joint coupling together adjacent conduits of the first and second bleed conduit sections. The second bleed conduit section is configured to rotate between a plurality of orientations relative to the first bleed conduit section and the compressor section via the first rotatable joint. The plurality of orientations correspond to a plurality of exhaust outlet orientations of the exhaust section.

In certain embodiments, a method includes coupling together, via a first rotatable joint, adjacent conduits of first and second bleed conduit sections of a bleed system configured to direct a bleed flow from a compressor section to an exhaust section of a gas turbine engine, wherein the first bleed conduit section is configured to couple to the compressor section, and the second bleed conduit section is configured to couple to the exhaust section. The method further includes rotating, via the first rotatable joint, the second bleed conduit section between a plurality of orientations relative to the first bleed conduit section and the compressor section, wherein the plurality of orientations correspond to a plurality of exhaust outlet orientations of the exhaust section.

In certain embodiments, a system includes a compressor section of a gas turbine engine, an exhaust section of the gas turbine engine, and a bleed system configured to direct a bleed flow from the compressor section to the exhaust section. The bleed system includes a first bleed conduit section coupled to the compressor section, a second bleed conduit section coupled to the exhaust section, and a first rotatable joint coupling together adjacent conduits of the first and second bleed conduit sections. The second bleed conduit section is configured to rotate between a plurality of orientations relative to the first bleed conduit section and the compressor section via the first rotatable joint, wherein the plurality of orientations correspond to a plurality of exhaust outlet orientations of the exhaust section.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
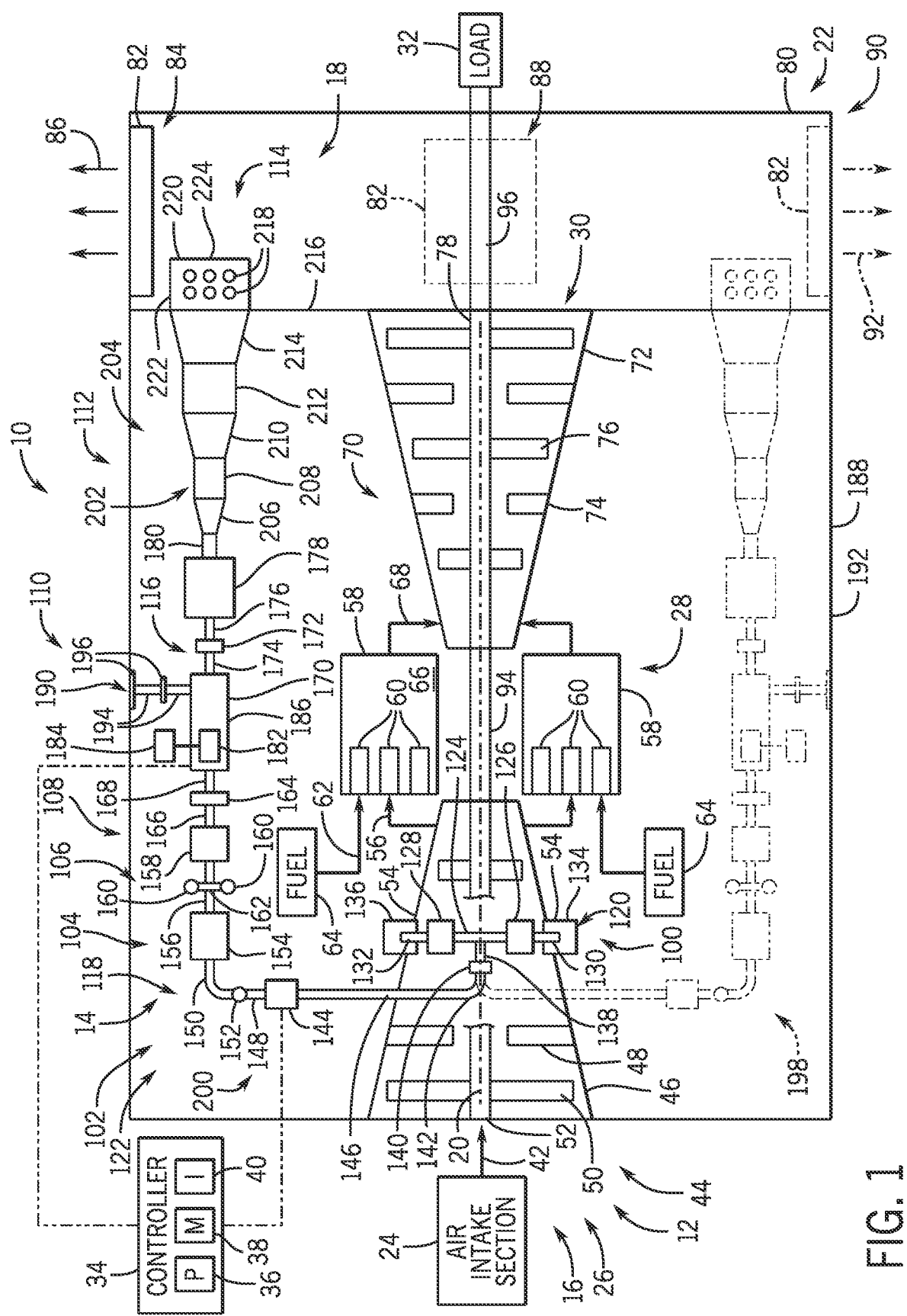
FIG. 1 is a schematic diagram of an embodiment of a gas turbine system having a bleed system configured to reorient in a plurality of different positions to accommodate different configurations of an exhaust section.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

A variety of systems, such as compressors, pumps, turbines, and various turbomachines may use a bleed system to bleed a fluid from one location to another. The bleed system may receive a bleed flow from a high pressure region and direct the bleed flow to a low pressure region. As discussed in detail below, the present bleed system includes a single set of components, which are configured to move between a plurality of different configurations, such as different exhaust outlet orientations (e.g., left hand exhaust outlet, right hand exhaust outlet, and top exhaust outlet) of an exhaust section. In other words, rather than using a different bleed system for each exhaust outlet orientation, the disclosed embodiments use the same bleed system (e.g., a single assembly of components) in multiple configurations of the same components, thereby providing a universal bleed system that can accommodate 2, 3, 4, 5, or more different configurations of the exhaust section.

Specifically, the present bleed system includes one or more rotational joints, which enable conduit sections to rotate about an axis. The bleed system also includes one or more mounting flanges, which can be reconfigured in different mounting configurations. A first bleed conduit section of the bleed system may remain in a fixed position relative to a compressor section of the gas turbine system, whereas a second bleed conduit section (or multiple bleed conduit sections) may be moved (e.g., rotated) and/or reconfigured to change a target location for delivering a bleed flow. The bleed system also includes a plurality of flexible and/or movable structures (e.g., gimbals, spring hangers, hinges, flexible conduits, and/or rotatable joints) configured to enable freedom of movement to accommodate thermal expansion and contraction and to provide flexibility when reconfiguring the bleed system between a plurality of configurations (e.g., different exhaust outlet orientations). Details of the bleed system are discussed in further detail below with reference to FIGS. 1-7.

FIG. 1 is a block diagram of an embodiment of a gas turbine system 10 having a gas turbine engine 12 to which a bleed system 14 is coupled. In the illustrated embodiment, the bleed system 14 extends between a high pressure region 16 and a low pressure region 18 of the gas turbine system 10. The bleed system 14 is configured to route a bleed flow between the high pressure region 16 and the low pressure region 18 in a variety of configurations of the gas turbine engine 12. In particular, the bleed system 14 is configured to move (e.g., rotate) between a plurality of orientations (e.g., angular orientations) about a central axis 20 of the gas turbine system 10, thereby enabling the same bleed system 14 to be used with various configurations of the gas turbine system 10, such as different configurations of an exhaust section 22 (e.g., different exhaust outlet orientations, such as exhaust outlets 82 directed crosswise to the central axis 20). Without the disclosed embodiments of the bleed system 14, a different bleed system may be necessary for each different configuration of the exhaust section 22, which would result in substantially greater manufacturing costs. The disclosed embodiments reduce the number of different bleed systems by incorporating a multi-configuration (e.g., multi-orientation) feature into the design of the bleed system 14.

The gas turbine engine 12 includes an air intake section 24, a compressor section 26, a combustion section 28, a turbine section 30, the exhaust section 22, and a load 32, such as an electrical generator. The gas turbine engine 12 also may include one or more controllers 34 having one or more processors 36, memory 38, and instructions 40 stored on the memory 38 and executable by processors 36 to perform various control functions of the gas turbine system 10 and the bleed system 14. For example, the controller 34 may be configured to control one or more valves of the bleed system 14 to control a bleed flow between the high and low pressure regions 16 and 18. The air intake section 24 may include one or more air filters, fluid injection systems (e.g., heated fluids and/or cooled fluids), anti-icing systems, silencer baffles, or any combination thereof. The air intake section 24 routes an air flow 42 into one or more compressor stages 44 of a compressor section 26.

The compressor section 26 includes a compressor casing 46, one or more vanes 48 extending inwardly from the compressor casing 46 in each of the compressor stages 44, one or more blades 50 extending outwardly from a shaft 52 in each of the compressor stages 44, and connections 54 with the bleed system 14. The shaft 52 is configured to rotate a plurality of circumferentially spaced blades 50 in each of the compressor stages 44, while a plurality of circumferentially spaced vanes 48 remain stationary in each of the compressor stages 44. The connections 54 may include fluid conduit connections with the bleed system 14, such as connections 54 at one or more of the compressor stages 44. The connections 54 may be disposed on opposite sides (e.g., diametrically opposite sides) of the compressor casing 46, or in any suitable location on the compressor casing 46. The compressor section 26 outputs a compressed air flow 56 into one or more combustors 58 of the combustion section 28.

Each combustor 58 includes one or more fuel nozzles 60, which are configured to route the compressed air 56 and fuel 62 from a fuel supply system 64 into a combustion chamber 66 of the combustor 58. The fuel 62 and the compressed air 56 mix and combust within the combustion chamber 66, thereby producing hot combustion gases 68 that are routed into the turbine section 30. In certain embodiments, the combustion section 28 has a single annular combustor 58 disposed circumferentially about a central axis of the gas turbine system 10. However, in some embodiments, the combustion section 28 includes a plurality of combustors 58 (e.g., combustor cans) spaced circumferentially about the central axis of the gas turbine system 10. The fuel nozzles 60 may include 1, 2, 3, 4, 5, 6, or more fuel nozzles, which may be configured to operate on one or more fuel circuits. The fuel circuits may be designed to deliver the same fuel or different fuels, such as liquid and gas fuels. Regardless, once the fuel combusts, the hot combustion gases 68 are used to drive the turbine section 30.

The turbine section 30 includes a plurality of turbine stages 70 configured to gradually expand the hot combustion gases 68 and drive components of the gas turbine system 10. The turbine section 30 includes a turbine casing 72, one or more turbine vanes 74 extending inwardly from the turbine casing 72 in each of the turbine stages 70, and one or more turbine blades 76 extending outwardly from a turbine shaft 78 in each of the one or more turbine stages 70. The turbine shaft 78 is driven to rotate by the hot combustion gases 68 flowing against a plurality of circumferentially spaced turbine blades 76 in each of the turbine stages 70, while a plurality of circumferentially spaced turbine vanes 74 remain stationary in each of the turbine stages 70. The hot combustion gases 68 expand through the turbine section 30 while driving rotation of the turbine blades 76 and turbine shaft 78 and then discharge through the exhaust section 22.

The exhaust section 22 includes an exhaust plenum 80 disposed downstream from the turbine section 30, and the exhaust plenum 80 includes an exhaust outlet 82. The exhaust outlet 82 may be positioned in a variety of exhaust outlet orientations depending on the particular configuration of the gas turbine system 10. In the illustrated embodiment, the exhaust outlet 82 is arranged in a right-hand orientation or configuration 84 on a right-hand side of the exhaust plenum 80 (when viewed from an aft end of the gas turbine system 10), thereby directing an exhaust flow in a right hand direction as indicated by arrows 86. However, the exhaust outlet 82 may be arranged in other configurations (shown in phantom lines in FIG. 1), such as a top orientation or configuration 88 to direct a vertical flow of the exhaust gas, or a left-hand orientation or configuration 90 configured to direct the exhaust flow in a left-hand direction as indicated by arrows 92. As discussed in further detail below, the bleed system 14 may be rotated or moved between the right-hand configuration 84, the top configuration 88, and/or the left-hand configuration 90 to accommodate different exhaust outlet orientations of the exhaust outlet 82 while using the same components of the bleed system 14.

In operation, the gas turbine engine 12 receives air through the air intake section 24, compresses the air in one or more compressor stages 44 via rotation of a plurality of compressor blades 50 in each of the compressor stages 44, and then routes the compressed air 56 into one or more combustors 58 of the combustion section 28. The combustors 58 combust the fuel 62 with the compressed air 56 via injection through the fuel nozzles 60 and combustion within the combustion chamber 66, and then route the hot combustion gases 68 into one or more turbine stages 70. The turbine stages 70 use the energy of the hot combustion gases 68 to drive a plurality of turbine blades 76 in each of the turbine stages 70, thereby driving rotation of the turbine shaft 78. In turn, the turbine shaft 78 drives rotation of a common shaft 94 between the turbine section 30 and the compression section 26, thereby driving the shaft 52 of the compressor section 26. The rotation of the turbine shaft 78 also drives rotation of a shaft 96 coupled to the load 32, which may be an electrical generator to generate electricity for a local facility or the power grid. In operation, the controller 34 is configured to control a fuel flow from the fuel supply system 64, a bleed flow through the bleed system 14, and other aspects of the gas turbine system 10.

The bleed system 14 is configured to route a compressed air stream from the high pressure region 16, which may include the compressor section 26, to the low pressure region 18, which may include the exhaust plenum 80 of the exhaust section 22. However, the bleed system 14 may be used between other high and low pressure regions of the gas turbine system 10. In the illustrated embodiment, the bleed system 14 includes a first bleed conduit section 100 fluidly coupled to the compressor section 26 via the connections 54, and a second bleed conduit section 102 movably (e.g., rotatably) coupled to the first bleed conduit section 100 and movably coupled to the exhaust section 22. The first and second bleed conduit sections 100 and 102 may include a plurality of flexible and/or movable structures, which are configured to provide freedom of movement in one or more directions (e.g., rotational direction, horizontal direction, and/or vertical direction). The flexible and/or movable structures may include, for example, one or more gimbals 104, one or more spring hangers 106, one or more flexible conduits or hoses, and one or more rotatable joints 108. The flexible and/or movable structures (e.g., 104, 106, and 108) may be configured to enable freedom of movement to accommodate thermal expansion and contraction in the bleed system 14 and between components of the gas turbine system 10, and to provide flexibility when reconfiguring the bleed system 14 between a plurality of configurations (e.g., different orientations of the second bleed conduit section 102 according to the exhaust section 26 configuration, such as configurations 84, 88, and 90 of the exhaust outlet 82). Additionally, the first and second bleed conduit sections 100 and 102 may include one or more mounting brackets 110, a staged expansion conduit 112, an outlet section 114, one or more straight conduits 116 between the various components, and one or more bending conduits or elbows 118 between the various components.

As discussed in further detail below, the first bleed conduit section 100 may have a U-shaped conduit configuration 120 configured to partially extend around opposite sides of the compressor section 26 before fluidly connecting with the internal fluid flow through the compressor section 26 via the connections 54. The U-shaped conduit configuration 120 of the first bleed conduit section 100 includes a central straight section or straight conduit 124 generally centered and oriented crosswise relative to the central axis 20, gimbals 126 and 128 coupled to opposite ends of the straight conduit 124, bending conduits or elbows 130 and 132 coupled to the respective gimbals 126 and 128, gimbals 134 and 136 coupled to the respective bending conduits or elbows 130 and 132, and the connections 54 between the gimbals 134 and 136 and the compressor casing 46 of the compressor section 26. In the illustrated embodiment, the U-shaped conduit configuration 120 may remain in a fixed orientation once mounted to the compressor casing 46, while the J-shaped conduit configuration 122 of the second bleed conduit section 102 may be reoriented or rotated about the central axis 20 to accommodate the different configurations 84, 88, and 90 of the exhaust outlet 82.

Additionally, the second bleed conduit section 102 may include a J-shaped conduit configuration 122, which extends from the first bleed conduit section 100 and turns toward and connects with the exhaust plenum 80 of the exhaust section 22 at the staged expansion conduit 112 and the outlet section 114. The J-shaped conduit configuration 122 of the second bleed conduit section 102 includes a straight conduit 138 coupled to the central straight conduit 124 in a generally crosswise orientation along the central axis 20 and a rotational joint 140 coupled to the straight conduit 138. The J-shaped conduit configuration 122 also includes a bending conduit or elbow 142 coupled to the rotational joint 140, a gimbal 144 coupled to the bending conduit or elbow 142 via an intermediate straight conduit 146, and a straight conduit 148 coupled to the gimbal 144 opposite the intermediate straight conduit 146. The J-shaped conduit configuration 122 also includes a bending conduit or elbow 150 coupled to the straight conduit 148, one or more spring hangers 152 coupled to one or both of the conduits 148 and 150, and a gimbal 154 coupled to the bending conduit or elbow 150. The J-shaped conduit configuration 122 also includes a straight conduit 156 coupled to (and extending between) the gimbal 154 and a gimbal 158 and a plurality of spring hangers 160 coupled to the straight conduit 156 via an intermediate bracket 162. The J-shaped conduit configuration 122 also includes a rotatable joint 164 removably coupled between a straight conduit 166 coupled to the gimbal 158 and a straight conduit 168 coupled to a valve assembly 170. The J-shaped conduit configuration 122 also includes a rotatable joint 172 removably coupled between a straight conduit 174 coupled to the valve assembly 170 and a straight conduit 176 coupled to a gimbal 178. The J-shaped conduit configuration 122 also includes a straight conduit 180 coupled to the gimbal 178 opposite the straight conduit 176, and the staged expansion conduit 112 is coupled to the straight conduit 180 and extends to the outlet section 114 in the exhaust section 22.

The valve assembly 170 may include one or more valves 182 driven by an actuator 184, which is communicatively coupled to and controlled by the controller 34. For example, the valve 182 may include a gate valve, a ball valve, a flapper valve, or any combination thereof. The actuator 184 may include an electric drive or motor, a solenoid, a pneumatic drive, a hydraulic drive, or any combination thereof. Accordingly, the controller 34 may control the actuator 184 to open and close the valve 182, thereby controlling a bleed flow through the bleed system 14, including the bleed flow through both the first and second conduit sections 100 and 102 between the high pressure region 16 in the compressor section 26 and the low pressure region 18 in the exhaust section 22. The valve assembly 170 also may include a protective shield, a tray to collect fluid spills or leaks, and/or a wall structure 186 at least partially or entirely extending around the valve 182 and/or the actuator 184.

The shield 186 of the valve assembly 170 also may be coupled to an enclosure 188 of the gas turbine engine 12 via a mounting bracket 190. In certain embodiments, the mounting bracket 190 may extend between and couple with the enclosure 188 and the valve assembly 170, the straight conduit 168, the straight conduit 174, and/or some other portion of the second bleed conduit section 102. The enclosure 188 may substantially or completely surround the compressor section 26, the combustion section 28, and the turbine section 30 of the gas turbine engine 12, and the mounting bracket 190 may rigidly support the valve assembly 170 and the second bleed conduit section 102 relative to a sidewall 192 of the enclosure 188. The mounting bracket 190 may include a plurality of bracket sections 194 coupled together with intermediate flanges 196. For example, the flanges 196 may be bolted together with a plurality of threaded fasteners, such as threaded bolts and nuts.

As discussed in detail below, the mounting bracket 190 may be removed, reoriented, and reinstalled when moving the J-shaped conduit configuration 122 of the second bleed conduit section 102 between different configurations for the different configurations 84, 88, and 90 of the exhaust outlet 82. In FIG. 1, the bleed system 14 is illustrated in an alternative configuration 198 as indicated by dashed lines. The alternative configuration 198 corresponds to the left-hand configuration 90 of the exhaust outlet 82 of the exhaust section 22. In particular, as discussed in detail below, the J-shaped conduit configuration 122 of the second bleed conduit section 102 is configured to rotate from the illustrated bleed conduit orientation or configuration 200 shown in solid lines to the alternative bleed conduit orientation or configuration 198 shown in dashed lines via rotation about the rotatable joint 140 disposed along the central axis 20, thereby enabling the J-shaped conduit configuration 122 to provide a similar or substantially identical configuration for either the right-hand configuration 84 of the exhaust outlet 82 and the left-hand configuration 90 of the exhaust outlet 82. In certain embodiments, one of the illustrated configurations 198 and 200 may be used for multiple configurations of the exhaust outlet 82, such as both the right-hand configuration 84 and the top configuration 88. The different configurations of the J-shaped conduit configuration 122 are discussed in greater detail below with reference to FIG. 2.

As further illustrated in FIG. 1, the staged expansion conduit 112 includes a plurality of alternating constant-diameter conduits 202 and expanding-diameter conduits 204, thereby defining a plurality of stages of expansion and depressurization. In particular, the illustrated staged expansion conduit 112 includes, in series, an expanding conduit 206, a constant conduit 208, an expanding conduit 210, a constant conduit 212, and an expanding conduit 214. The conduits 206, 208, 210, 212, and 214 progressively increase in diameter and cross-sectional area, wherein each constant conduit 208 and 212 has a constant diameter and cross-sectional area, and each expanding conduit 206, 210, and 214 has a gradually increasing diameter and cross-sectional area in a direction of bleed flow. The expanding conduit 214 is coupled to an end wall 216 of the exhaust section 122 between the enclosure 188 and the exhaust plenum 80. The expanding conduit 214 also leads into the outlet section 114, which is disposed inside of the exhaust plenum 80. At a connection between the staged expansion conduit 112 and the end wall 216, the bleed system 14 may enable freedom of movement in one or more directions, such axial, radial, and/or rotational directions of movement relative to the end wall 216. The outlet section 114 includes a plurality of outlets 218 disposed in an annular housing 220, wherein the outlets 218 are configured to distribute or diffuse the bleed flow from the bleed system 14 into the exhaust plenum 80. For example, the outlets 218 may be disposed along a sidewall 222 (e.g., annular sidewall) and an end wall 224 (e.g., axially facing end wall) of the annular housing 220. In certain embodiments, the connection between the end wall 216 and the staged expansion conduit 112 and/or the outlet section 114 may include a moveable joint configured to enable axial movement and/or rotation therebetween.

The staged expansion conduit 112 is configured to gradually depressurize the bleed flow to reduce the vibration and/or noise of the bleed system 14, such as vibration of a bleed valve. The staged expansion conduit 112 may have at least two stages configured to gradually (e.g., incrementally) depressurize the bleed flow. Each stage of the staged expansion conduit 112 may have an expansion section and/or a diffuser plate. The number of stages may be determined at least in part on the difference in pressure between the high pressure region 16 and the low pressure region 18. More stages may be used for large pressure differences than for small pressure differences. The expansion sections increase the dimension of the staged expansion conduit 112 to at least reduce the static pressure of the bleed flow. The diffuser plates partially obstruct the bleed flow and permit passage of the bleed flow through orifices. The diffuser plates are configured to at least reduce the kinetic energy or dynamic pressure of the bleed flow. The characteristics of the expansion sections (e.g., expansion percentage, size, cross-sectional shape, length) and diffuser plates (e.g., orifice size, orifice quantity, orifice shape, orifice configuration, diffuser plate size) affect the vibration of the bleed system 14.

Vibration and thermal expansion/contraction of the bleed system 14 may cause the bleed system 14 to move. Certain mounting and coupling features may be utilized to accommodate the movements of the bleed system 14. For example, the various components of the bleed system 14 may be configured to allow for movement in one or more directions, such as an axial direction along an axis of the conduit, rotationally about the axis of the conduit, in a horizontal direction, a vertical direction, or any combination thereof. Each gimbal 104 may be configured to allow for axial movement, rotational movement, or any combination thereof, relative to an axis of the adjacent conduits. The rotatable joints 108 are configured to enable rotation about an axis of the adjacent conduits. The rotatable joints 108 also may be configured to enable separation and reattachment of the adjacent conduits. The spring hangers 106 are configured to enable movement along an axis of the spring portion of the spring hangers, which may be oriented in a vertical direction, a horizontal direction, or any other suitable angular direction between horizontal and vertical within the enclosure 188 of the gas turbine engine 12. For example, each of the spring hangers 106 may be hung from a top wall or ceiling of the enclosure 188, thereby allowing some vertical movement of the various conduits and sections of the bleed system 14. Additionally, as discussed above, the gimbals 104, the rotatable joints 108, and the spring hangers 106 (e.g., flexible and/or movable structures) are configured to help enable reconfiguration of the bleed system 14 between different configurations, such as different orientations of the second bleed conduit section 102 to accommodate the different exhaust outlet orientations (e.g., 86, 88, and 90).

In the illustrated embodiment, when reconfiguring the bleed system 14 between the configurations 198 and 200 of the J-shaped conduit configuration 122 of the second bleed conduit section 102, the rotatable joint 140 may be loosened to enable rotation of the second bleed conduit section 102 about the central axis 20, such that the second bleed conduit section 102 moves from the configuration 200 to the configuration 198 (or vice versa). Additionally, the rotatable joints 164 and 172 may be loosened and disconnected to allow reorientation of the valve assembly 170 and the mounting bracket 190, thereby enabling the valve assembly 170 and the mounting bracket 190 to be oriented in a proper configuration to mount against the sidewall 192 of the enclosure 188 on the opposite side of the enclosure 188, as illustrated by the alternative configuration 198. In the illustrated embodiment, the rotatable joint 140 is aligned with the central axis 20 (e.g., in a common vertical plane with the central axis 20), thereby enabling the J-shaped conduit configuration 122 of the second bleed conduit section 102 to rotate between a plurality of symmetrical configurations, such as the configurations 198 and 200.

Figure 2:
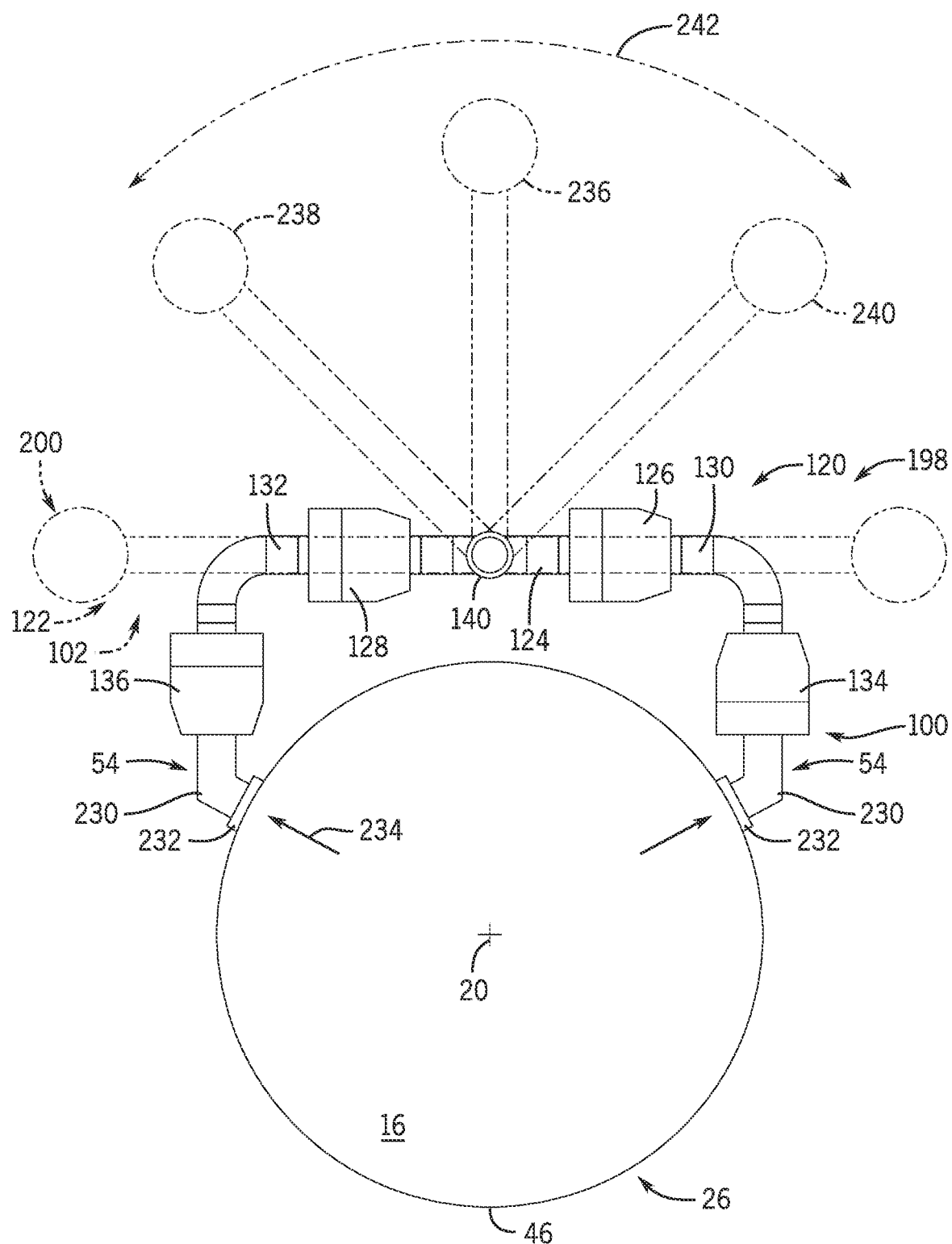
FIG. 2 is a schematic side view of an embodiment of the bleed system of FIG. 1, illustrating a plurality of orientations of a second bleed conduit section relative to a first bleed conduit section coupled to a compressor section.

FIG. 2 is a schematic view of an embodiment of the gas turbine engine 12 and the bleed system 14 taken in a plane perpendicular to the central axis 20 of FIG. 1, further illustrating details of the different configurations of the bleed system 14. In the illustrated embodiment, the first bleed conduit section 100 has the gimbals 126, 128, 134, and 136, and the conduits 124, 130, 132 arranged in the U-shaped conduit configuration 120, which partially wraps around opposite sides of the compressor casing 46 of the compressor 26. The U-shaped conduit configuration 120 may be symmetric relative to the rotatable joint 140 and/or the plane perpendicular to the central axis 20 (e.g., the plane through the central axis 20 and the rotatable joint 140). The connections 54 include conduits 230 fluidly and mechanically coupled to the compressor casing 46 via mounting flanges 232. The mounting flanges 232 may be coupled to the compressor casing 46 via one or more fasteners, such as threaded fasteners (e.g., bolts), welded joints, brazed joints, clamps, dovetail joints, or other removable or fixed joints.

The first bleed conduit section 100 is configured to receive a bleed flow 234 (e.g., a compressed air flow) from the high pressure region 16 inside the compressor section 26 and to route the bleed flow through the various conduits 230, 130, 132, and 124 into the second bleed conduit section 102, which connects with the first bleed conduit section 100 via the rotatable joint 140. Again, each of the gimbals 104, including gimbals 126, 128, 134, and 136, is configured to enable movement (e.g., expansion and contraction) in an axial direction relative to the adjacent conduits, rotation about the axis of the adjacent conduits, or any combination thereof.

When reconfiguring the bleed system 14 between different configurations, the second bleed conduit section 102 is configured to rotate about the rotatable joint 140 as indicated by the bleed conduit orientations or configurations 198, 200, 236, 238, and 240. The configurations 198 and 200 correspond to the configurations shown and described above with reference to FIG. 1. The configuration 236 is oriented midway between the configurations 198 and 200, such that the second bleed conduit section 102 is substantially perpendicular relative to the second bleed conduit sections 102 in the configurations 198 and 200. The configurations 238 and 240 are approximately midway between the configurations 200 and 236 and the configurations 198 and 236, respectively. However, the second bleed conduit section 102 may be rotated about the rotational joint 140 to any angular orientation as indicated by arrows 242. In FIG. 2, the various components of the second bleed conduit section 102 are removed for simplicity; however, the second bleed conduit section 102 may include each of the components discussed above with reference to FIG. 1. For example, the flexible and/or movable structures (e.g., gimbals 104, spring hangers 106, and rotatable joints 108) are configured to provide flexibility in the first and second bleed conduit sections 100 and 102 when reconfiguring (e.g., rotating) the second bleed conduit section 102 as illustrated in FIG. 2.

Figure 3:
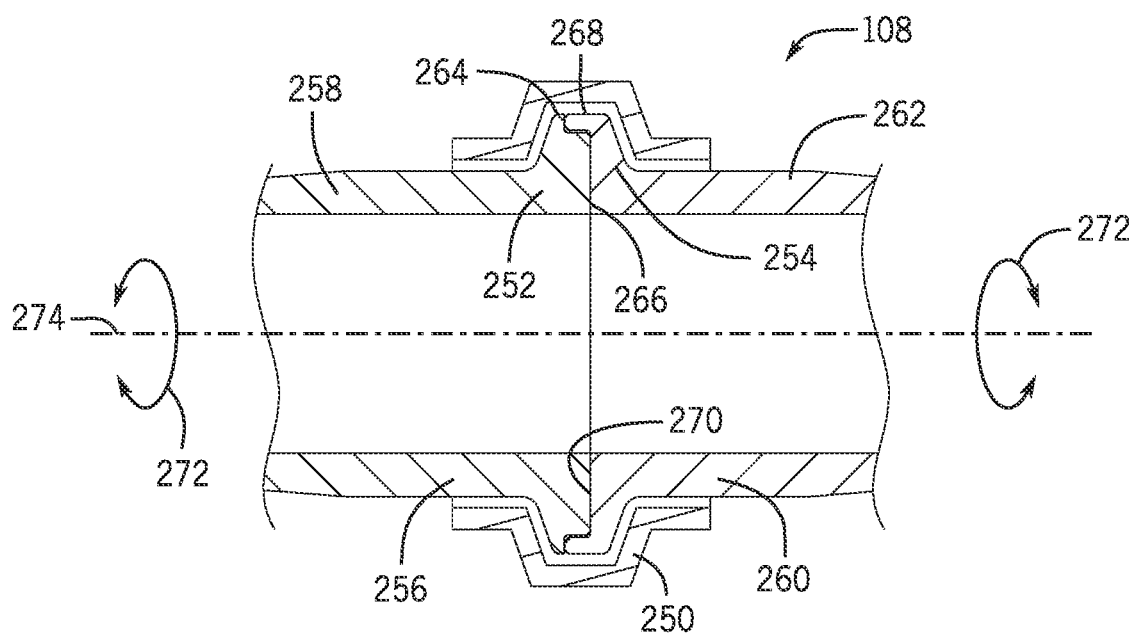
FIG. 3 is a schematic cross-sectional view of an embodiment of a rotatable joint configured to enable rotation between the first and second bleed conduit sections of the bleed system of FIGS. 1 and 2.

FIG. 3 is a schematic cross-sectional side view of one of the rotatable joints 108, such as the rotatable joints 140, 164, and 172, of the second bleed conduit section 102 of FIG. 1. The rotatable joint 108 may include an annular clamp 250 disposed about a male joint portion 252 inserted within a female joint portion 254. The male joint portion 252 is disposed at an end portion 256 of a conduit 258, while the female joint portion 254 is disposed on an end portion 260 of a conduit 262. The male joint portion 252 may include an annular outer lip 264 protruding radially outwardly from the conduit 258, and an axially extending annular portion 266 projecting at the end portion 256. The female joint portion 254 may include an annular outer lip 268 protruding radially outwardly from the conduit 262 and an axially recessed annular portion or cavity 270 disposed inwardly into the end portion 260. The male joint portion 252 has the axially extending annular portion 266 inserted into the axially recessed annular portion 270, while the annular clamp 250 extends circumferentially around both of the annular outer lips 264 and 268.

The annular clamp 250 is configured to compressively secure the annular outer lips 264 and 268 and to hold together the connection between the axially extending annular portion 266 and the axially recessed annular portion 270. When the annular clamp 250 is tightened about the annular outer lips 264 and 268, the rotatable joint 108 may be held in a fixed rotational position between the conduits 258 and 262, such that the conduits 258 and 262 cannot rotate relative to one another. However, the annular clamp 250 may be loosened and/or removed to enable movement (e.g., rotation) between and/or separation of the conduits 258 and 262. For example, by loosening the annular clamp 258, the conduits 258 and 262 may be rotated relative to one another as indicated by arrows 272 about a central axis 274 of the rotatable joint 108. As discussed above and in further detail below, the rotatable joint 108 is configured to enable rotation between the different configurations 198, 200, 236, 238, and 240 of the second bleed conduit section 102 relative to the first bleed conduit section 100, and also to enable reconfiguration of the valve assembly 170 and the mounting bracket 190.

Figure 4:
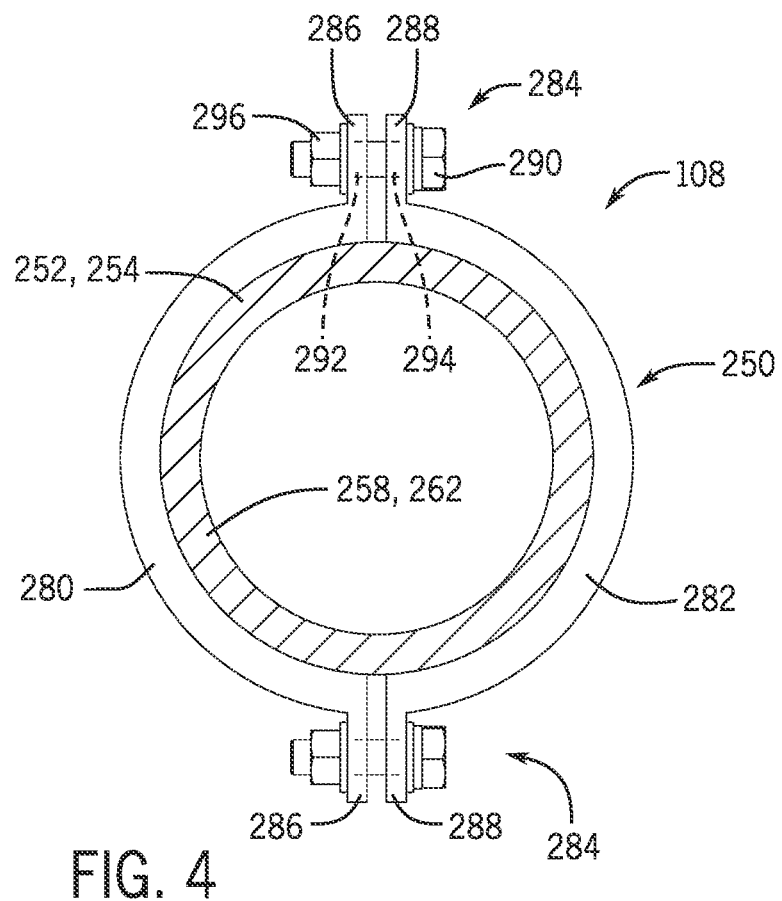
FIG. 4 is a cross-sectional view of an embodiment of the rotatable joint of FIG. 3, further illustrating details of an annular clamp configured to enable loosening, tightening, rotation, and separation of adjacent conduits connected at the rotatable joint.

FIG. 4 is a cross-sectional side view of the rotatable joint 108 as illustrated in FIG. 3, further illustrating details of the annular clamp 250 disposed about the male joint portion 252 and the female joint portion 254 of the conduits 258 and 262. As illustrated, the annular clamp 250 includes a plurality of clamp sections, such as semi-annular clamp sections 280 and 282 (e.g., C-shaped clamp sections). The semi-annular clamp sections 280 and 282 are disposed about the male and female joint portions 252 and 254, and the semi-annular clamp sections 280 and 282 are coupled together via fasteners 284 disposed in adjacent flanges 286 and 288 of the respective semi-annular clamp sections 280 and 282. The fasteners 284 may include threaded bolts 290 extending through bolt holes 292 and 294 in the respective flanges 286 and 288, through which the threaded bolts 290 connect with threaded nuts 296 to compressively secure the flanges 286 and 288 together. In the illustrated embodiment, the annular clamp 250 includes the two semi-annular clamp sections 280, and two sets of mating flanges 286 and 288. In some embodiments, the annular clamp 250 may include a split-ring clamp having a single set of flanges 286 and 288 at a single break in the annular clamp 250, or the annular clamp 250 may include a greater number (e.g., 3, 4, 5, or more) of clamp sections and associated flanges 286 and 288.

The fasteners 284 are configured to compressively couple together the semi-annular clamp sections 280 and 282 about the male and female joint portions 252 and 254, thereby limiting rotational movement between the conduits 258 and 262. However, the fasteners 284 may be loosened to enable movement (e.g., rotation movement) between the male and female joint portions 252 and 254 and thus rotational movement between the conduits 258 and 262. When reconfiguring the second bleed conduit section 102 between the different configurations 198, 200, 236, 238, and 240, the fasteners 284 may be loosened sufficiently to enable easier rotation of the second bleed conduit section 102 about the rotational joint 140. Likewise, the rotational joints 164 and 172 may be loosened via loosening of the fasteners 284, thereby enabling reorientation of the valve assembly 170 and the mounting bracket 190 between the different configurations of the second bleed conduit section 102.

Figure 5:
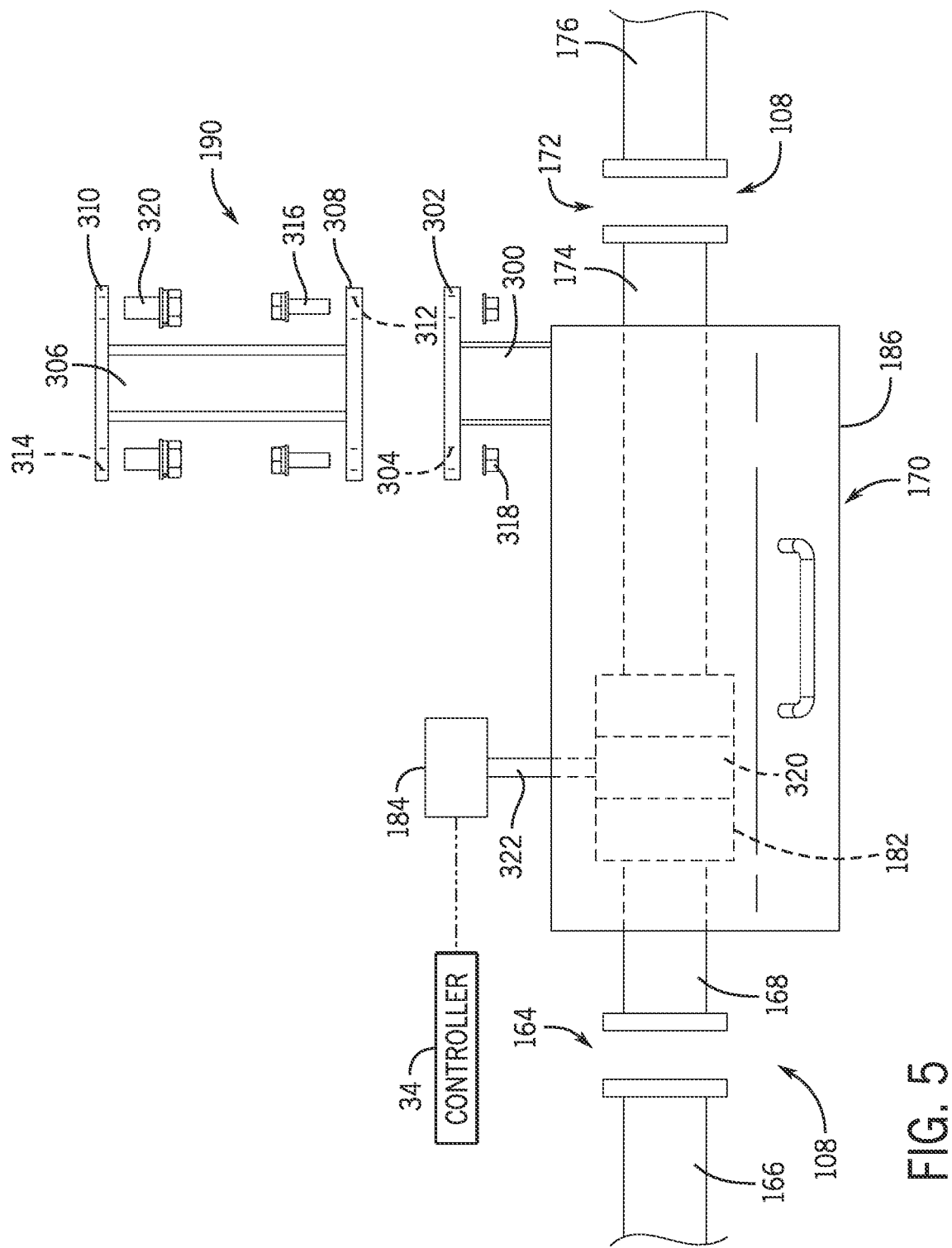
FIG. 5 is a schematic view of an embodiment of a valve assembly and a mounting bracket configured to be disconnected and reconnected in different configurations via rotatable joints and removable flanges.

FIG. 5 is a schematic view of an embodiment of the valve assembly 170, the mounting bracket 190, and the rotational joints 164 and 172 disposed between the straight conduits 166 and 168 and the straight conduits 174 and 176. The valve assembly 170 may be moved between a plurality of orientations via disconnection and/or rotational movement at the rotational joints 164 and 172 when reconfiguring the second bleed conduit section 102 relative to the first bleed conduit section 100. In the illustrated embodiment, the reorientation of the valve assembly 170 is performed by loosening and/or disconnecting each of the rotatable joints 164 and 172, which may have the features of the rotatable joint 108 as discussed above with reference to FIGS. 3 and 4. For example, the valve assembly 170 may be rotated about an axis of the straight conduits 166, 168, 174, and 176, such as rotation between 0 and 360 degrees about the axis.

The valve assembly 170 also may be reoriented along with the mounting bracket 190. The mounting bracket 190 includes a mounting bracket or arm 300 coupled to the shield 186 of the valve assembly 170, wherein the mounted bracket or arm 300 includes a flange 302 having fastener receptacles 304. The mounting bracket 190 also includes a mounting bracket or arm 306 having flanges 308 and 310 on opposite ends of the arm 306. The flange 308 includes fastener receptacles 312, while the flange 310 includes fastener receptacles 314. The flanges 302 and 308 of the arms 300 and 306 are configured to removably couple together via threaded fasteners 316 (e.g., threaded bolts) extending through the fastener receptacles 304 and 312 and connecting with mating threaded fasteners 318 (e.g., threaded nuts). Similarly, the flange 310 is configured to mount to the side wall 192 of the enclosure 188 of the gas turbine engine 12 as illustrated in FIG. 1 by extending threaded fasteners 320 (e.g., threaded bolts) through the fastener receptacles 314 into the sidewall 192.

The illustrated fasteners 316, 318, and 320 are removable threaded fasteners, which may include any number of threaded bolts and nuts. In certain embodiments, the fasteners 316, 318, and 320 may include other types of threaded fasteners and/or removable fasteners, such as fastening clamps, spring-loaded fasteners, dovetail joints, hinged joints, or any combination thereof. Accordingly, the removability of the fasteners 316, 318, and 320 is configured to enable reconfiguration of the mounting bracket 190 when changing the valve assembly 170 and the entire second bleed conduit section 102 between the different configurations, such as configurations 198, 200, 236, 238, and 240. As further illustrated in FIG. 5, the controller 34 is configured to operate the actuator 184 to open and close the valve 182 in the valve assembly 170. The valve 182 may include a valve element 320 (e.g., ball, gate, flapper, etc.) coupled to the actuator 184 via a valve stem 322. For example, the actuator 184 may rotate and/or axially move the valve stem 322 to move the valve element 320 between open and closed positions between the straight conduits 168 and 174.

Figure 6:
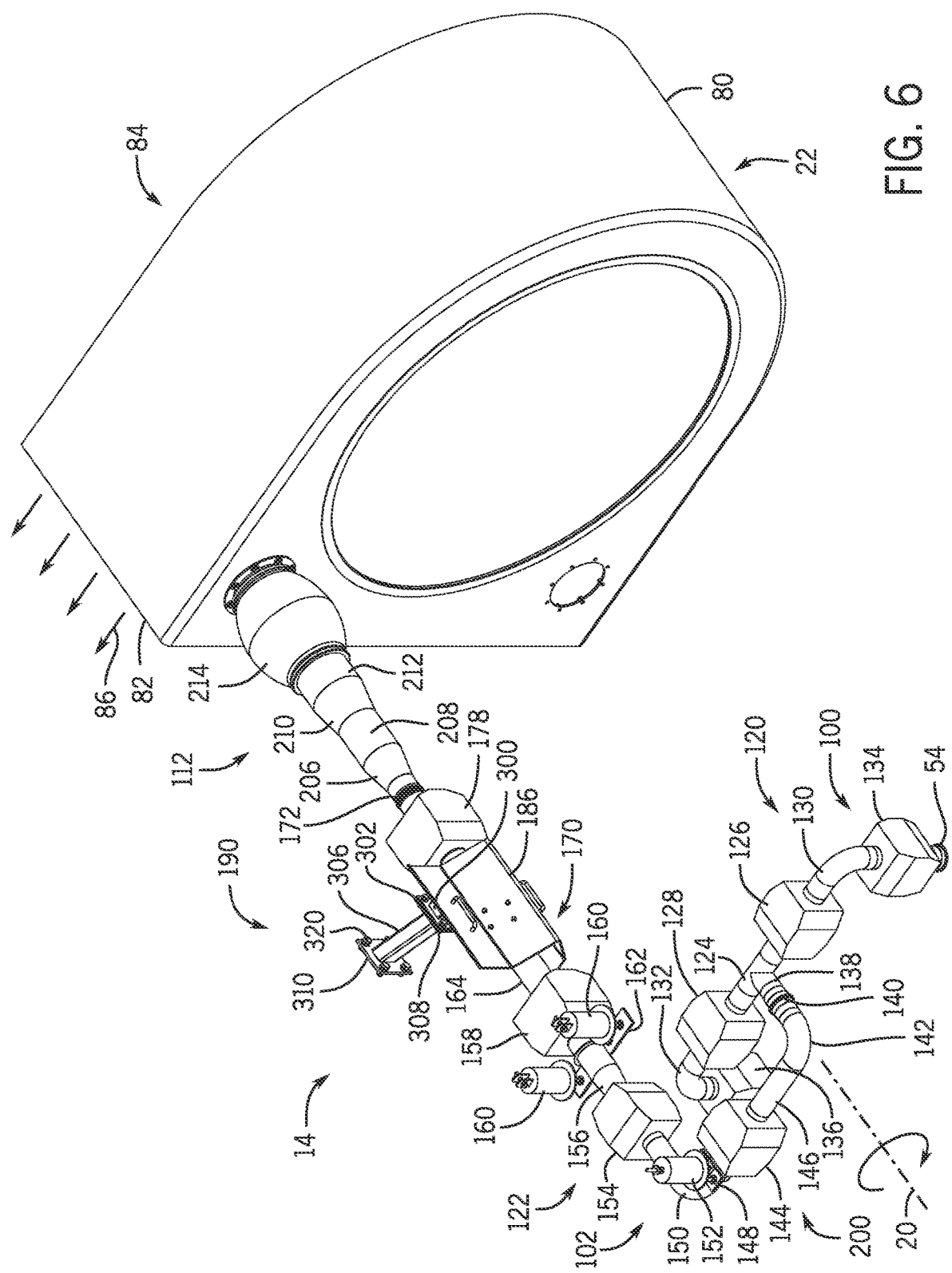
FIG. 6 is a partial perspective view of an embodiment of the bleed system coupled to the exhaust section of the gas turbine system of FIG. 1, further illustrating details of the second bleed conduit section in a first configuration relative to the first bleed conduit section.

FIG. 6 is a partial perspective view of the gas turbine system 10 and the bleed system 14 of FIGS. 1-5, further illustrating details of the bleed system 14 coupled to the exhaust section 22 in the configuration 200 of the second bleed conduit section 102 and the right-hand configuration 84 of the exhaust outlet 82. In certain embodiments, the configuration 200 of the second bleed conduit section 102 as illustrated in FIG. 6 also may be used for the top configuration 88 of the exhaust outlet 82 as illustrated in FIG. 1. However, any number of alternative configurations of the bleed system 14 may be achieved to accommodate different orientations of the exhaust outlet 82.

As illustrated in FIG. 6, the first bleed conduit section 100 has the U-shaped conduit configuration 120 disposed in a fixed configuration relative to the central axis 20, while the J-shaped conduit configuration 122 of the second bleed conduit section 102 is disposed in the configuration 200 via rotation relative to the rotatable joint 140. The gimbals 104, the spring hangers 106, the rotatable joints 108, the staged expansion conduit 112, the straight conduits 116, and the bending conduits or elbows 118 of the second bleed conduit section 102 and the first bleed conduit section 100 are substantially the same as described in detail above. However, in the illustrated configuration, the rotatable joint 172 is disposed between the gimbal 178 and the staged expansion conduit 112 rearward of the gimbal 178, and the rotatable joint 164 is disposed partially within the shield 186 of the valve assembly 170. Furthermore, the illustrated mounting bracket 190 has the mounting bracket or arm 300 coupled to the straight conduit 174 rather than the shield 186.

When changing the configuration of the bleed system 14 and the exhaust outlet 82, the second bleed conduit section 102 is rotated about the rotatable joint 140, which is disposed along the central axis 20. One or both of the rotatable joints 164 and 172 may be loosened and/or disconnected to allow reorientation of the valve assembly 170 and the mounting bracket 190. Additionally, the mounting brackets or arms 300 and 306 may be disconnected at the flanges 302, 308, and 310, and then reconfigured for the alternative configuration 198 as illustrated in FIG. 1 and further illustrated in FIG. 7.

Figure 7:
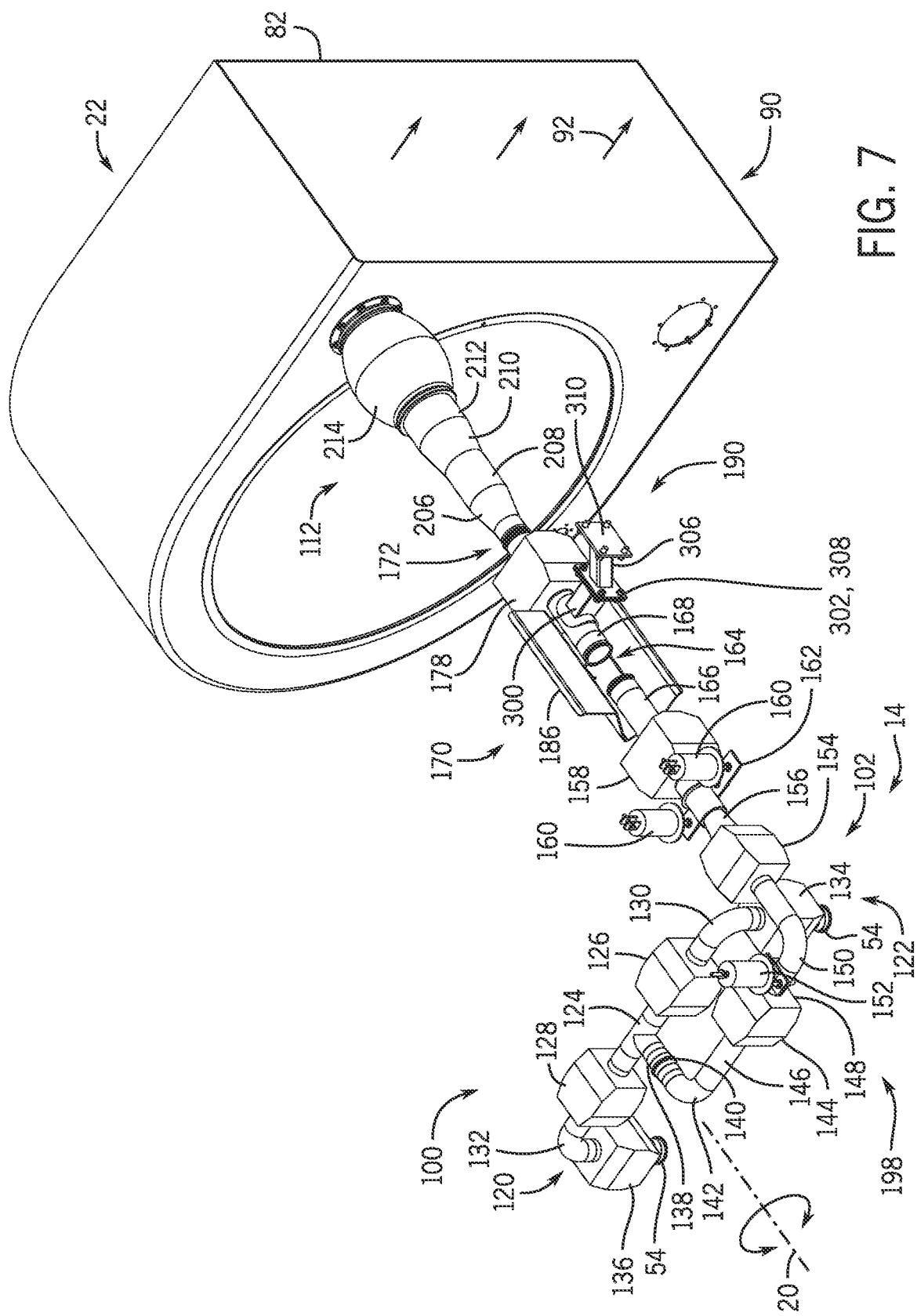
FIG. 7 is a partial perspective view of an embodiment of the bleed system of FIG. 6, further illustrating a reorientation of the second bleed conduit section relative to the first bleed conduit section to accommodate a different configuration of the exhaust section.

FIG. 7 is a partial perspective view of the gas turbine system 10 and the bleed system 14 of FIGS. 1-6, further illustrating details of the bleed system 14 coupled to the exhaust section 22 in the configuration 198 of the second bleed conduit section 102 and the left-hand configuration 90 of the exhaust outlet 82. Again, the bleed system 14 has substantially the same components as FIGS. 1-6, including the gimbals 104, the spring hangers 106, the rotatable joints 108, the mounting bracket 190, the staged expansion conduit 112, the straight conduits 116, and the bending conduits or elbows 118. However, in the illustrated embodiment of FIG. 7, the bleed system 14 has the same modifications as discussed above with reference to FIG. 6.

As illustrated in FIG. 7, the second bleed conduit section 102 has been rotated approximately 180 degrees about the central axis 20 via the rotatable joint 140 as compared with the configuration 200 of FIG. 6. In the illustrated configuration 198, the second bleed conduit section 102 extends toward the exhaust section 22 with the exhaust outlet 82 in the left-hand configuration 90. Again, the rotatable joints 164 and/or 172 may be loosened or disconnected to facilitate the reorientation of the valve assembly 170 and the mounting bracket 190. Additionally, the mounting bracket 190 may be reconfigured by disconnecting the mounting brackets or arms 300 and 306 at the flanges 302, 308, and 310. As illustrated in FIG. 7, the mounting bracket 190 is directly coupled to the straight conduit 168 rather than the shield 186 of the valve assembly 170. In particular, the mounting bracket or arm 300 is directly coupled to the straight conduit 168. After the second bleed conduit section 102 has been rotated from the configuration 200 of FIG. 6 to the configuration 198 of FIG. 7, the rotatable joint 140 may be retightened and secured in its rotational position, and the rotational rotatable joints 164 and 172 may be reconnected and retightened to secure the rotational position between the straight conduits 166, 168, 174 and 176. Although FIGS. 6 and 7 illustrate only the configurations 198 and 200 of the second bleed conduit section 102 relative to the first bleed conduit section 100, the bleed system 14 may be reconfigured into a plurality of positions as discussed above with reference to FIG. 2.

Technical effects of the disclosed embodiments include a reconfigurable bleed system, which can be used with a plurality of different orientations of an exhaust section (e.g., left, right, and top exhaust outlet orientations). In particular, the bleed system is reconfigurable via a rotatable joint along a central axis, such that the bleed system can rotate between a plurality of different orientations taking advantage of the symmetry about the rotatable joint. The bleed system also includes various flexible and/or movable structures, such as gimbals, spring hangers, and rotatable joints, configured to provide freedom of movement of the bleed system.

The subject matter described in detail above may be defined by one or more clauses, as set forth below.

A system includes a bleed system configured to direct a bleed flow from a compressor section to an exhaust section of a gas turbine engine. The bleed system includes a first bleed conduit section configured to couple to the compressor section, a second bleed conduit section configured to couple to the exhaust section, and a first rotatable joint coupling together adjacent conduits of the first and second bleed conduit sections. The second bleed conduit section comprises a set of components configured to rotate between a plurality of orientations relative to the first bleed conduit section and the compressor section via the first rotatable joint. The plurality of orientations correspond to a plurality of exhaust outlet orientations of the exhaust section.

The system of the preceding clause, wherein the first rotatable joint extends along a central axis of the gas turbine engine, and the plurality of orientations includes different angular orientations about the central axis.

The system of any preceding clause, including the gas turbine engine having the compressor section, the exhaust section, a turbine section, and a combustor section.

The system of any preceding clause, wherein each of the plurality of exhaust outlet orientations is oriented crosswise to a central axis of the gas turbine engine.

The system of any preceding clause, wherein the plurality of exhaust outlet orientations includes at least one of a left-hand exhaust orientation, a right-hand exhaust orientation, or a top exhaust orientation.

The system of any preceding clause, wherein the set of components in the second bleed conduit section is common for each orientation of the plurality of orientations.

The system of any preceding clause, wherein the first bleed conduit section includes a U-shaped conduit configuration.

The system of any preceding clause, wherein the U-shaped conduit configuration includes a central straight conduit extending between first and second bending conduits, and the central straight conduit is coupled to the first rotatable joint.

The system of any preceding clause, wherein the first bleed conduit section includes a plurality of gimbals disposed along one or more of the central straight conduit, the first bending conduit, or the second bending conduit.

The system of any preceding clause, wherein the second bleed conduit section includes a J-shaped conduit configuration.

The system of any preceding clause, wherein the second bleed conduit section includes one or more gimbals and one or more spring hangers.

The system of any preceding clause, wherein the second bleed conduit section includes a staged expansion conduit having a plurality of expanding conduits arranged in stages along a direction of a bleed flow through the bleed system.

The system of any preceding clause, wherein the second bleed conduit section includes a mounting bracket configured to mount the second bleed conduit section to a wall of an enclosure of the gas turbine engine.

The system of any preceding clause, wherein the second bleed conduit section includes a second rotatable joint and a third rotatable joint disposed along a conduit of the second bleed conduit section upstream and downstream of the mounting bracket, respectively.

The system of any preceding clause, wherein the conduit includes a valve configured to adjust a bleed flow through the bleed system, wherein the valve is disposed between the second and third rotatable joints.

The system of any preceding clause, wherein the mounting bracket includes first and second mounting arms removably coupled together at mating flanges, the first mounting arm is coupled to the second bleed conduit section, and the second mounting arm is configured to couple to the wall of the enclosure of the gas turbine engine.

A method includes coupling together, via a first rotatable joint, adjacent conduits of first and second bleed conduit sections of a bleed system configured to direct a bleed flow from a compressor section to an exhaust section of a gas turbine engine, wherein the first bleed conduit section is configured to couple to the compressor section, and the second bleed conduit section comprises a set of components configured to couple to the exhaust section. The method further includes rotating, via the first rotatable joint, the second bleed conduit section between a plurality of orientations relative to the first bleed conduit section and the compressor section, wherein the plurality of orientations corresponds to a plurality of exhaust outlet orientations of the exhaust section, and wherein the set of components in the second bleed conduit section is the same for each orientation of the plurality of orientations.

The method of the preceding clause, wherein the first rotatable joint extends along a central axis of the gas turbine engine, and the plurality of orientations includes different angular orientations about the central axis.

A system includes a compressor section of a gas turbine engine, an exhaust section of the gas turbine engine, and a bleed system configured to direct a bleed flow from the compressor section to the exhaust section. The bleed system includes a first bleed conduit section coupled to the compressor section, a second bleed conduit section coupled to the exhaust section, and a first rotatable joint coupling together adjacent conduits of the first and second bleed conduit sections. The second bleed conduit section is configured to rotate between a plurality of orientations relative to the first bleed conduit section and the compressor section via the first rotatable joint, wherein the plurality of orientations corresponds to a plurality of exhaust outlet orientations of the exhaust section, and wherein the set of components in the second bleed conduit section is the same for each orientation of the plurality of orientations.

The system of the preceding clause, wherein the first rotatable joint extends along a central axis of the gas turbine engine, and the plurality of orientations includes different angular orientations about the central axis.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a bleed system configured to direct a bleed flow from a compressor section to an exhaust section of a gas turbine engine, wherein the bleed system comprises:
a first bleed conduit section configured to couple to the compressor section;
a second bleed conduit section having a portion configured to couple to a wall of an exhaust plenum of the exhaust section, wherein the exhaust plenum comprises an exhaust outlet downstream from the second bleed conduit section; and
a first rotatable joint coupling together adjacent conduits of the first and second bleed conduit sections, wherein the second bleed conduit section comprises a set of components configured to rotate via the first rotatable joint between a plurality of orientations relative to the first bleed conduit section, the compressor section, and the exhaust section, wherein the plurality of orientations are configured to align the portion of the second bleed conduit section with a plurality of opening positions along the wall of the exhaust plenum, wherein the plurality of orientations corresponds to a plurality of exhaust outlet orientations of the exhaust outlet of the exhaust plenum.

2. The system of claim 1, wherein a rotational axis of the first rotatable joint extends along a central axis of the gas turbine engine, the plurality of orientations comprises different angular orientations of the second bleed conduit section and the plurality of opening positions about the central axis and circumferentially offset from one another along the wall of the exhaust plenum, the plurality of exhaust outlet orientations of the exhaust outlet comprise different angular orientations of the exhaust outlet about the central axis and circumferentially offset from one another, and the portion of the second bleed conduit section is radially offset from the rotational axis.

3. The system of claim 1, comprising the gas turbine engine having the compressor section, the exhaust section, a turbine section, and a combustor section, wherein the exhaust section comprises a plurality of openings in the wall of the exhaust plenum corresponding to the plurality of opening positions, wherein the plurality of openings are spaced apart from one another along the wall.

4. The system of claim 1, wherein each of the plurality of exhaust outlet orientations of the exhaust outlet is oriented crosswise to a central axis of the gas turbine engine.

5. The system of claim 1, wherein the plurality of exhaust outlet orientations of the exhaust outlet comprises at least two of a left-hand exhaust orientation of the exhaust outlet, a right-hand exhaust orientation of the exhaust outlet, or a top exhaust orientation of the exhaust outlet.

6. The system of claim 1, wherein the plurality of opening positions comprise at least a left-hand opening position and a right-hand opening position along the wall of the exhaust plenum.

7. The system of claim 1, wherein the first bleed conduit section comprises a U-shaped conduit configuration extending at least partially circumferentially about the compressor section relative to a central axis of the gas turbine engine.

8. The system of claim 7, wherein the U-shaped conduit configuration comprises a central straight conduit extending between first and second bending conduits, the central straight conduit extends crosswise to the central axis, the first rotatable joint extends along the central axis, and the central straight conduit is coupled to the first rotatable joint.

9. The system of claim 8, wherein the first bleed conduit section comprises a plurality of gimbals disposed along one or more of the central straight conduit, the first bending conduit, or the second bending conduit.

10. The system of claim 8, wherein the second bleed conduit section comprises a J-shaped conduit configuration extending from the first rotatable joint to the portion coupled to the wall of the exhaust plenum.

11. The system of claim 10, wherein the second bleed conduit section comprises one or more gimbals and one or more spring hangers.

12. The system of claim 11, wherein the second bleed conduit section comprises a staged expansion conduit having a plurality of expanding conduits arranged in stages along a direction of a bleed flow through the bleed system.

13. The system of claim 11, wherein the second bleed conduit section comprises a mounting bracket configured to mount the second bleed conduit section to an enclosure wall of an enclosure of the gas turbine engine.

14. The system of claim 13, wherein the second bleed conduit section comprises a second rotatable joint and a third rotatable joint disposed along a conduit of the second bleed conduit section upstream and downstream of the mounting bracket, respectively.

15. The system of claim 14, wherein the conduit comprises a valve configured to adjust a bleed flow through the bleed system, wherein the valve is disposed between the second and third rotatable joints.

16. The system of claim 14, wherein the mounting bracket comprises first and second mounting arms removably coupled together at mating flanges, the first mounting arm is coupled to the second bleed conduit section, and the second mounting arm is configured to couple to the enclosure wall of the enclosure of the gas turbine engine.

17. A method, comprising:
coupling together, via a first rotatable joint, adjacent conduits of first and second bleed conduit sections of a bleed system configured to direct a bleed flow from a compressor section to an exhaust section of a gas turbine engine, wherein the first bleed conduit section is configured to couple to the compressor section, and the second bleed conduit section comprises a set of components and a portion configured to couple to a wall of an exhaust plenum of the exhaust section, wherein the exhaust plenum comprises an exhaust outlet downstream from the second bleed conduit section; and
rotating, via the first rotatable joint, the second bleed conduit section between a plurality of orientations relative to the first bleed conduit section, the compressor section, and the exhaust section, wherein the plurality of orientations are configured to align the portion of the second bleed conduit section with a plurality of opening positions along the wall of the exhaust plenum, wherein the plurality of orientations corresponds to a plurality of exhaust outlet orientations of the exhaust outlet of the exhaust plenum, and wherein the set of components in the second bleed conduit section is the same for each orientation of the plurality of orientations.

18. The method of claim 17, wherein a rotational axis of the first rotatable joint extends along a central axis of the gas turbine engine, the plurality of orientations comprises different angular orientations of the second bleed conduit section and the plurality of opening positions about the central axis and circumferentially offset from one another along the wall of the exhaust plenum, and the plurality of exhaust outlet orientations of the exhaust outlet comprise different angular orientations of the exhaust outlet about the central axis and circumferentially offset from one another, and the portion of the second bleed conduit section is radially offset from the rotational axis.

19. A system, comprising:
a compressor section of a gas turbine engine;
an exhaust section of the gas turbine engine; and
a bleed system configured to direct a bleed flow from the compressor section to the exhaust section, wherein the bleed system comprises:
a first bleed conduit section coupled to the compressor section;
a second bleed conduit section having a portion coupled to a wall of an exhaust plenum of the exhaust section, wherein the exhaust plenum comprises an exhaust outlet downstream from the second bleed conduit section; and
a first rotatable joint coupling together adjacent conduits of the first and second bleed conduit sections, wherein the second bleed conduit section is configured to rotate via the first rotatable joint between a plurality of orientations relative to the first bleed conduit section, the compressor section, and the exhaust section, wherein the plurality of orientations are configured to align the portion of the second bleed conduit section with a plurality of opening positions along the wall of the exhaust plenum, wherein the plurality of orientations corresponds to a plurality of exhaust outlet orientations of the exhaust outlet of the exhaust plenum, and wherein a set of components in the second bleed conduit section is the same for each orientation of the plurality of orientations.

20. The system of claim 19, wherein a rotational axis of the first rotatable joint extends along a central axis of the gas turbine engine, the plurality of orientations comprises different angular orientations of the second bleed conduit section and the plurality of opening positions about the central axis and circumferentially offset from one another along the wall of the exhaust plenum, the plurality of exhaust outlet orientations of the exhaust outlet comprise different angular orientations of the exhaust outlet about the central axis and circumferentially offset from one another, and the portion of the second bleed conduit section is radially offset from the rotational axis.

* * * * *